United States Patent
DeWitt et al.

(10) Patent No.: US 7,165,295 B2
(45) Date of Patent: Jan. 23, 2007

(54) ROPE LOCK WITH OUT-OF-BALANCE INDICATOR AND AUTOMATIC LOCKOUT

(75) Inventors: Frank DeWitt, Holcomb, NY (US); Rodney Kaiser, Syracuse, NY (US)

(73) Assignee: J.R. Clancy, Incorporated, Syracuse, NY (US)

( * ) Notice: Subject to any disclaimer, the term of this patent is extended or adjusted under 35 U.S.C. 154(b) by 207 days.

(21) Appl. No.: 10/938,286

(22) Filed: Sep. 10, 2004

(65) Prior Publication Data
US 2006/0053597 A1    Mar. 16, 2006

(51) Int. Cl.
*F16G 11/00* (2006.01)
(52) U.S. Cl. .................. 24/132 WL; 24/115 R
(58) Field of Classification Search ............... 188/65.1, 188/65.2; 24/115 R, 132 R–132 WL
See application file for complete search history.

(56) References Cited

U.S. PATENT DOCUMENTS

| | | | |
|---|---|---|---|
| 1,944,603 A * | 1/1934 | Hecker | 24/134 R |
| 2,991,526 A | 7/1961 | Kuebler | |
| 3,327,999 A * | 6/1967 | Mitchell | 24/134 R |
| 4,790,049 A * | 12/1988 | Grosh | 24/132 WL |
| 5,083,350 A | 1/1992 | Sandreid | |
| 5,531,297 A * | 7/1996 | Pipan | 188/65.1 |
| 2003/0094333 A1 | 5/2003 | Hossler | |

* cited by examiner

*Primary Examiner*—James R. Brittain
(74) *Attorney, Agent, or Firm*—George R. McGuire; Bond, Schoeneck & King, PLLC

(57) ABSTRACT

A rope lock is disclosed, suitably adapted for use in theatrical applications that use counterweight rigging systems. The rope lock includes an indicator to show if the counterweight rigging system is in- or out-of-balance. The rope lock also includes an automatic lockout that prevents the rope lock from being unlocked if there is an out-of-balance condition.

8 Claims, 3 Drawing Sheets

ROPE LOCK WITH OUT-OF-BALANCE INDICATOR AND AUTOMATIC LOCKOUT

BACKGROUND OF THE INVENTION

1. Field of the Invention

The present invention relates to rope locks that are used to secure control ropes for raising or lowering scenery sets and other equipment on theatrical stages.

2. Description of Prior Art

The theater industry uses, among others, counterweight rigging systems to raise, lower and suspend scenery sets, lighting equipment ("loads") and other equipment that is used in theatrical productions and events. A typical counterweight rigging set consists of a balanced system of weights and pulleys by which loads can be raised and lowered. Each set is comprised of a load batten suspended from pickup cables which pass over loft block sheaves, then over a head block at one side of the stage, and finally down to a counterweight arbor. The arbor holds weights that are adjusted by the user to balance (or counterweight) the load. Movement of the load is controlled by a rope hand line that passes from the top of the arbor over the head block, down through a rope block mounted on the locking rail, around a tensioning floor block and back to the bottom of the arbor.

Rope locks used in such counterweight rigging systems fix the rope hand line in position while a load is suspended or while a load and/or counterweight is being added to or removed from the system. As a result, the rope lock must be able to fix the rope in position not only when the load and counterweight are balanced ("in-balance condition"), but also when the load and counterweight are out-of-balance ("out-of-balance condition").

Under normal operation of the counterweight system, the rope lock can be released while the system is in balance, allowing the operator to move the load up or down by moving the rope hand line. If the rope lock is released when the system is out of balance, either the load or the counterweight may fall, potentially causing damage to equipment and injury to individuals in the area. It is therefore important that the rope lock be released only when the system is in balance.

It is known to manufacturer rope locks that include means of retaining a rope in position when a counterweight system is out of balance. Such rope locks, however, allow the handle of the rope lock to move to a release position even if the counterweight system is out of balance. Furthermore, it is difficult for an operator of such a system to determine when the system has been brought back into balance.

3. Objects and Advantages

It is therefore a principal object and advantage of the present invention to provide a rope lock with a release handle that cannot be opened when it is locking a counterweight system that is out of balance.

It is a further object and advantage of the present invention to provide a rope lock that displays an indicator when a counterweight system is out of balance.

SUMMARY OF THE INVENTION

In accordance with the foregoing objects and advantages, the present invention provides a rope lock that comprises two jaws mounted in a jaw block that may be selectively activated to grip a rope using a release handle pivotally attached to the jaw block. The jaw block is mounted in a housing and slides on guide rails mounted within the housing. The guide rails have springs that bias the jaw block toward a central position on the guide rails. The front of the housing contains a slot into which the release handle can rotate when selectively gripping the rope. When the rope has been locked and experiences an out of balance condition that exceeds the springs' preset threshold, the jaw block moves relative to the housing and against one set of springs, which causes a locking pin to be secured behind the face of the housing. This locking pin prevents the release handle from being pivoted to the unlocked position while the system is out of balance.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
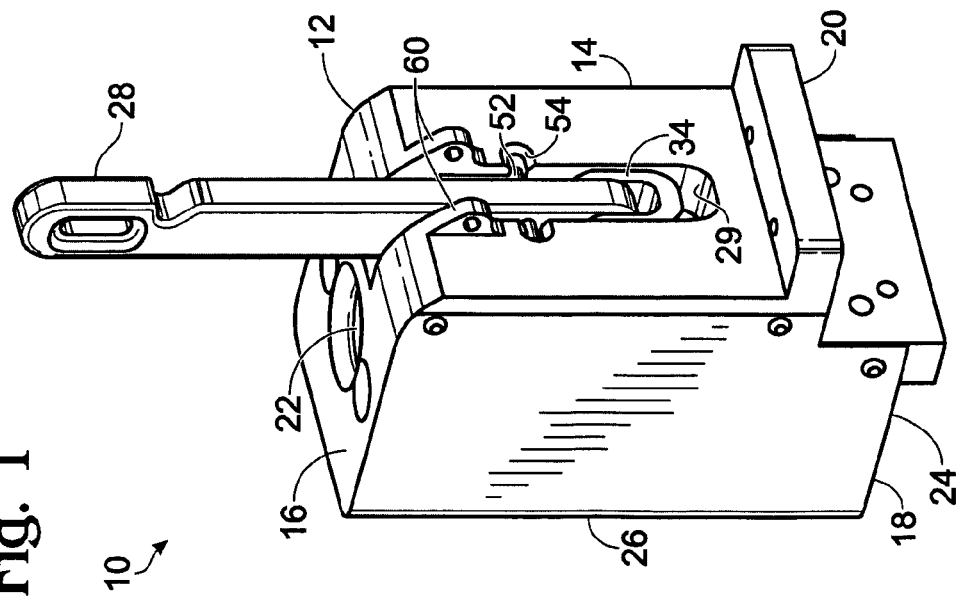
FIG. 1 is a front perspective view of the present invention.

Referring now to the drawings, wherein like reference numerals refer to like parts throughout, there is seen in FIG. 1 a rope lock assembly 10, comprising a housing 12, which has a housing face 14, a housing upper plate 16 and a housing lower plate 18. The housing is preferably made of ductile iron, but other materials of sufficient rigidity and durability are also acceptable.

The rope lock assembly 10 also comprises a mounting bracket 20, an upper rope aperture 22 in the housing upper plate 16, a lower rope aperture 24 in the housing lower plate 18, and an outer cover 26. The mounting bracket 20 is shaped so that it can be secured (e.g., by bolts or clamps) to a mounting rail (not shown) in a counterweight rigging assembly. The upper rope aperture 22 and lower rope aperture 24 are sized to allow unrestricted passage of a rope (not shown) that is part of a counterweight rigging assembly. Preferably, upper rope aperture 22 and lower rope aperture 24 have rounded edges to minimize friction as the rope passes through. The outer cover 26 may be removable for maintenance and repair.

The rope lock assembly 10 also comprises a release handle 28 that is pivotally attached to a jaw block 30. Preferably, the release handle 28 is made of ductile iron, but other materials of sufficient rigidity and durability are also acceptable. In the preferred embodiment, when pivoted to a locked position the release handle 28 fits into a release handle slot 29 in the housing face 14. When pivoted to an unlocked position, the release handle 28 is generally perpendicular to the housing face 14.

Figure 2:
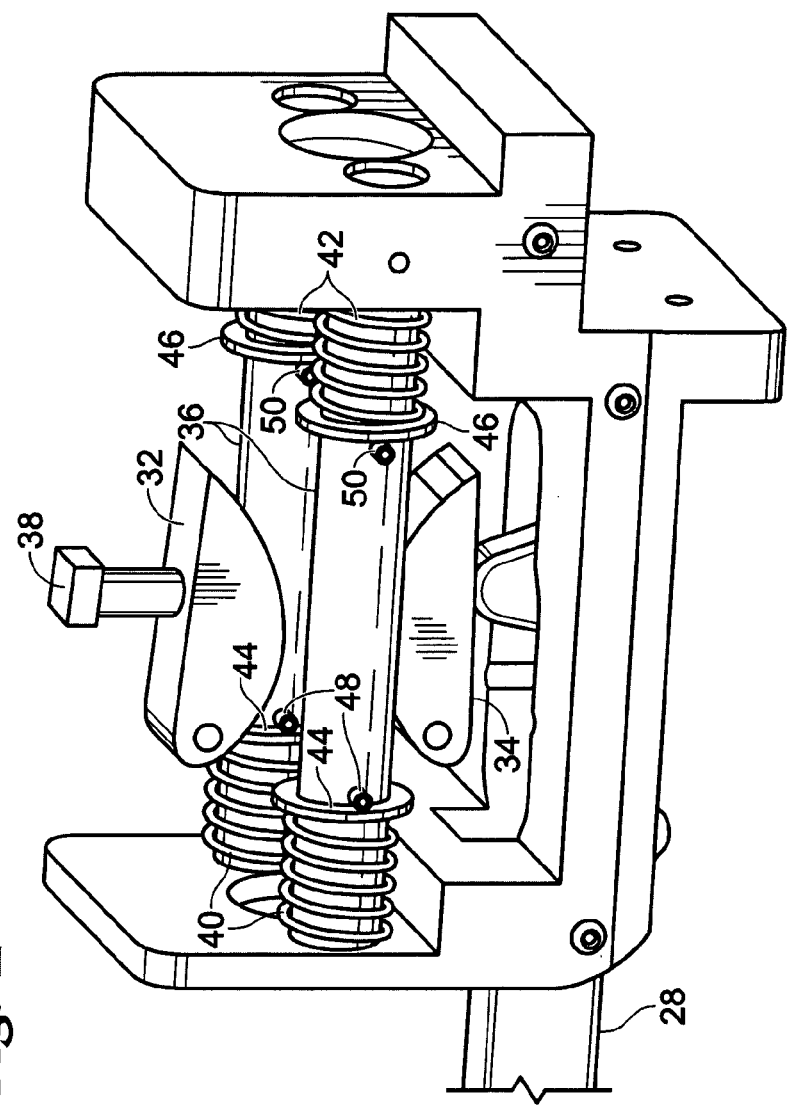
FIG. 2 is a partial side perspective view of the present invention.

Referring now to FIG. 2, the rope lock assembly 10 grips the rope (not shown) by means of a first jaw 32 and a second jaw 34. Preferably, first jaw 32 and second jaw 34 are pivotally mounted within the jaw block 30 (the jaw block 30 is not shown in FIG. 2 to provide an unobstructed view of the jaws). Alternatively, first jaw 32 and second jaw 34 may be slidably mounted within the jaw block 30 in such a way that they can slide perpendicular to the rope's direction of travel. The jaws 32, 34 have a smooth clamping surface to minimize wear on the rope as it passes between the jaws when the lock is open. Preferably, jaws 32, 34 are made of ductile iron. The jaws 32, 34 have a concave clamping surface to provide maximum contact between the jaws 32, 34 when the lock is closed.

The jaw block 30 slides on guide rails 36 that are mounted in the housing 12 and are oriented parallel to the path of the rope through the rope lock assembly 10. Preferably, jaw block 30 is made of aluminum, but other materials of sufficient rigidity and durability are also acceptable. Guide rails 36 are preferably made of stainless steel, but other materials that are durable and that will allow the jaw block 30 to slide freely on the rails are also acceptable. A portion of the jaw block 30 extends through the release handle slot 29 in the housing face 14 and slides within the release handle slot 29 as the jaw block 30 slides along the guide rails 36. The release handle 28 is pivotally attached to the jaw block 30, preferably to the portion of the jaw block 30 that extends through the release handle slot 29 in the housing face 14.

The first jaw 32 and second jaw 34 grip the rope when the second jaw 34 is forced toward the first jaw 32 by a cam portion of release handle 28. Preferably, the cam portion of release handle 28 exerts pressure on second jaw 34 when the release handle 28 is pivoted to a locked position. In the locked position the release handle 28 is positioned in the release handle slot 29 on the housing face 12. When the release handle 28 is pivoted to an unlocked position, it exerts no pressure on second jaw 34 and second jaw 34 is not forced toward first jaw 32. In the unlocked position, the rope is free to pass between the jaws 32, 34.

In the preferred embodiment, the gap between first jaw 32 and second jaw 34 when the release handle 28 is in an unlocked position can be adjusted by means of a tension adjuster 38. The tension adjuster 38 also controls the degree of pressure exerted on the rope by jaws 32, 34 when the release handle 28 is in the locked position. In the preferred embodiment, the tension adjuster 38 comprises a bolt that passes through threads in jaw block 30 to set a rearward limit for first jaw 32. Preferably, tension adjuster 38 also includes means for fixing such a bolt in position, for example a jam nut.

Figure 3A:
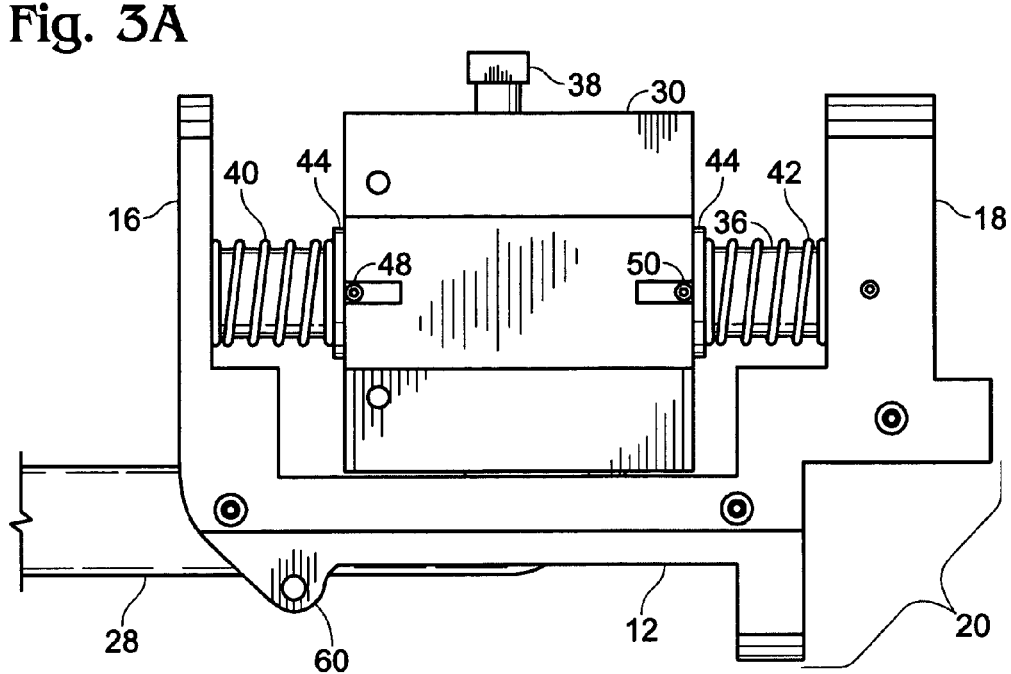
FIG. 3A is a side elevation view of an embodiment of the present invention.
Figure 3B:
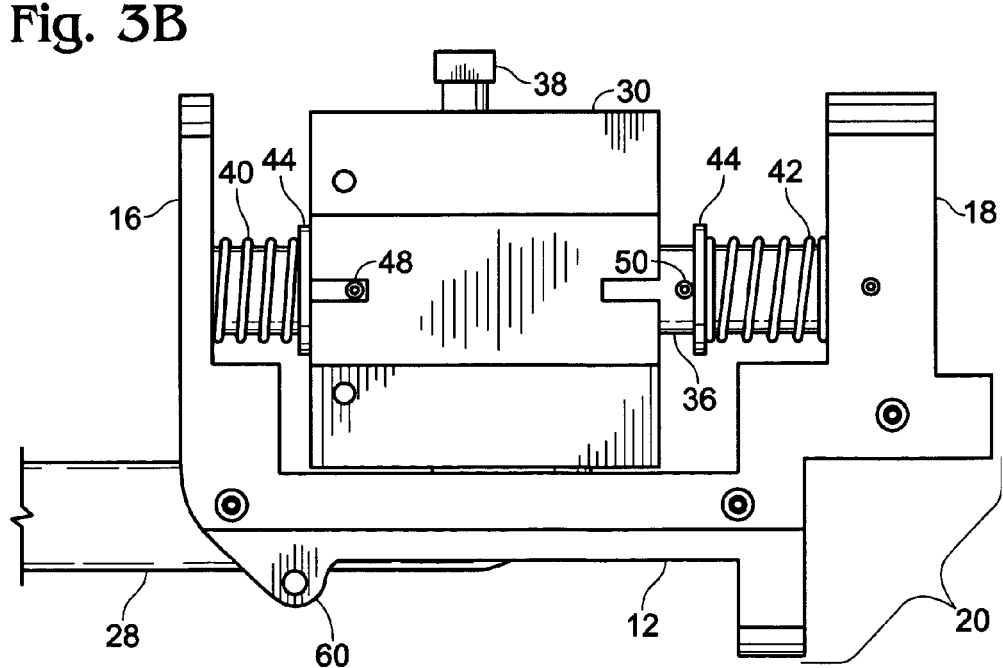
FIG. 3B is another side elevation view of an embodiment of the present invention.

Referring now to FIGS. 3A and 3B, there is shown a side elevation view of rope lock assembly 10, with outer cover 26 removed for clarity. As described above, jaw block 30 slides on guide rails 36. As shown in FIG. 3A, when the release handle 28 is in the locked position and the counterweight rigging system is in-balance (i.e., the load and counterweight are equal), the jaw block 30 is centrally positioned on the guide rails 36. The central position of the jaw block 30 is maintained by upper spring 40 and lower spring 42. In an in-balance condition, jaw block 30 rests between upper spring 40 and lower spring 42 and upper spring 40 and lower spring 42 do not exert any force on jaw block 30. According to the preferred embodiment, upper spring 40 is stopped by upper spring washer 44, which in turn is stopped by upper retaining pin 48. Lower spring 42 is stopped by lower spring washer 46, which in turn is stopped by lower retaining pin 50. Jaw block 30 fits closely between upper spring washer 44 and lower spring washer 46, and is not free to slide along guide rails 36 without contacting one of upper spring washer 44 or lower spring washer 46. Alternatively, upper spring 40 and lower spring 42 may be stopped by upper retaining pin 48 and lower retaining pin 50, respectively, without use of intervening upper spring washer 44 and lower spring washer 46. In this alternate embodiment, upper spring 40 and lower spring 42 would act directly on jaw block 30.

As shown in FIG. 3B, when release handle 28 is in the locked position and the counterweight rigging system is out-of-balance (i.e., the load and counterweight are not equal), the out-of-balance condition moves the jaw block 30 from the central position on guide rails 36. When the jaw block 30 moves from the central position, it is forced against one of the upper spring washer 44 or lower spring washer 46, compressing the respective upper spring 40 or lower spring 42. The direction of displacement of the jaw block 30 depends on the type of out-of-balance condition: in the preferred embodiment, a counterweight rigging system out-of-balance with a heavy load will force the jaw block 30 against the upper spring washer 44; out-of-balance with a light load will force jaw block 30 against the lower spring wisher 46. The magnitude of displacement of the jaw block 30 from the central position is determined by the degree to which the counterweight rigging system is out of balance and the bias strength of the spring 42, 44 being compressed.

Preferably, upper spring 40 and lower spring 42 are compression springs having an approximately equal resistance to compression. Preferably, upper spring 40 and lower spring 42 are preloaded. That is, upper spring 40 is compressed between the housing upper plate 16 and the upper spring washer 44 and lower spring 42 is compressed between housing lower plate 18 and lower hosing spring 46. In the preferred embodiment, each of upper spring 40 and lower spring 42 are preloaded to 25 lbs. Thus, a minor out-of-balance condition (i.e., one in which the difference between the counterweight and load is less than 50 lbs.) will not displace the jaw block 30 away from a central position on the guide rails 36. The magnitude of preloading of the upper spring 40 and lower spring 42 can be chosen to set a threshold imbalance at which the automatic lockout feature of the rope lock assembly 10 will be engaged.

The compression resistance of upper spring 40 and lower spring 42 must be such that in an out-of-balance condition jaw block 30 will move sufficiently from the central position on guide rails 36 to engage the automatic lockout described below. Preferably, upper spring 40 and lower spring 42 are made of steel, but other materials are also acceptable and fall within the scope of this invention.

Upper retaining pin 48 and lower retaining pin 50 protrude from the surface of guide rails 36. In the preferred embodiment, therefore, jaw block 30 comprises slots for receiving the retaining pin 48 and lower retaining pin 50 when the jaw block 30 is compressed against one of upper spring washer 44 or lower spring washer 46.

Figure 4:
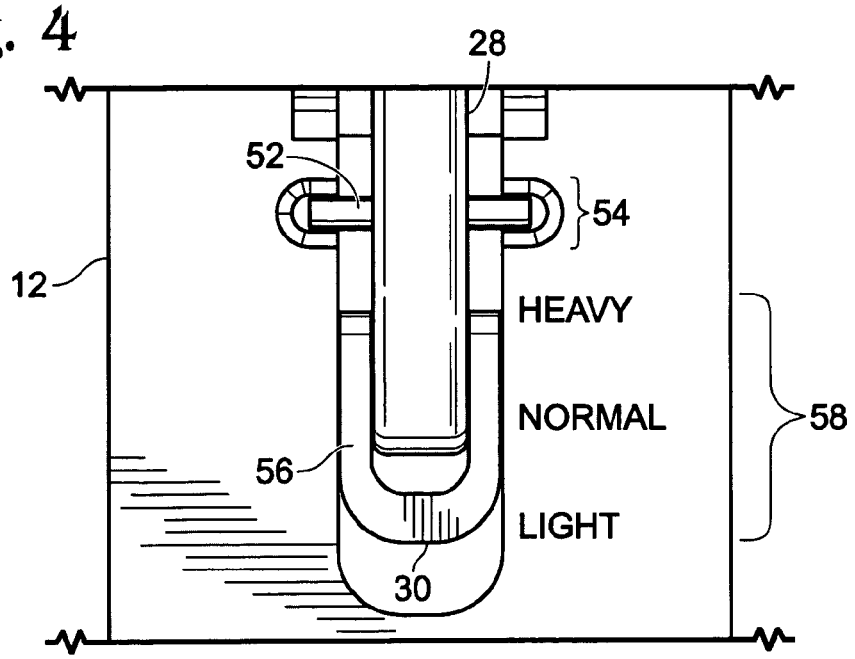
FIG. 4 is a partial front elevation view of an embodiment of the present invention.
Figure 5:
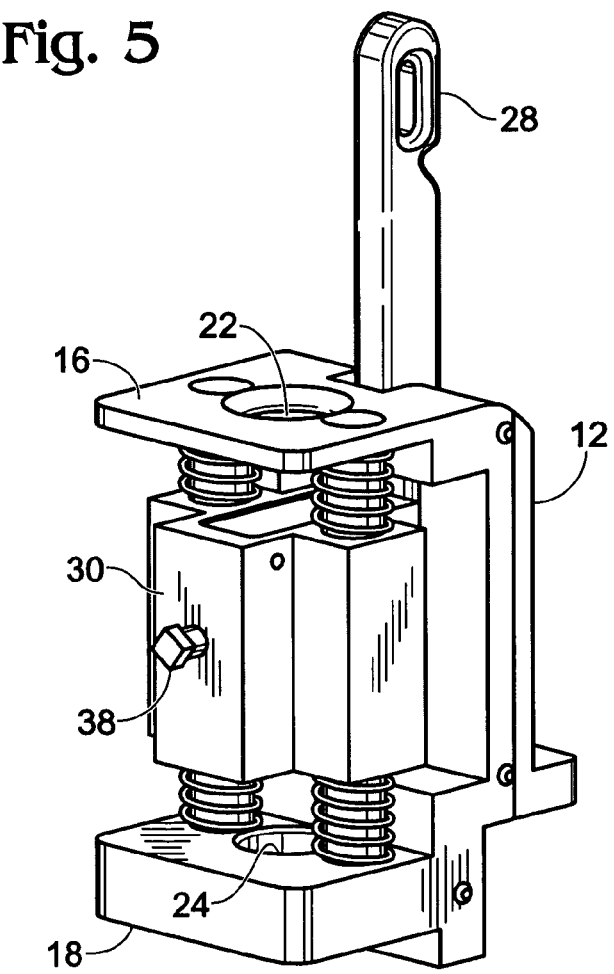
FIG. 5 is a rear side perspective view of an embodiment of the present invention.

Referring now to FIG. 4, the automatic lockout feature of the preferred embodiment is depicted. Release handle 28 comprises a locking pin 52, which preferably extends from the sides of release handle 28. When the rope lock assembly 10 is attached to a rope in a counterweight rigging system that is in-balance, locking pin 52 is aligned with and freely passes through locking pin slot 54 on housing face 14 and release handle 28 is free to pivot with respect to jaw block 30. After release handle 28 is pivoted to a locked position, if the counterweight rigging system to which rope lock assembly 10 is attached experiences an out-of-balance condition, locking pin 52 is no longer aligned with locking pin slot 54. Locking pin 52 is thus retained behind housing face 14 when the rope lock assembly 10 is locked in an out-of-balance counterweight rigging system. This prevents release handle 28 from being pivoted to an unlocked position until the counterweight rigging system is brought into balance (e.g., by adjusting the relative weights of the counterweight and load), at which time the jaw block 30 will be forced back to a central position on the guide rails 36 and locking pin 52 will align with locking pin slot 54 to allow release handle 28 to pivot to an unlocked position.

A rope lock assembly 10 according to the present invention also comprises an indicator to give a visual display that shows if a locked counterweight rigging system is in-or out-of-balance and shows whether such an out-of-balance system has a heavy or light load. According to the preferred embodiment, rope lock assembly 10 comprises an indicator 56 that moves with jaw block 30 and shows its position relative to an indicator scale 58. In one embodiment, indicator 56 is a needle or pin that is attached to release handle 28. Alternatively, indicator 56 may be attached to jaw block 30. In another embodiment, indicator 56 is a visible line on jaw block 30. Alternatively, indicator 56 may be a line on release handle 28. Preferably, indicator 56 is clearly distinguishable from its background surrounding to allow an operator of rope lock assembly 10 to determine easily if the associated counterweight rigging system is in-or out-of-balance. If indicator 56 is a pin attached to release handle 28, it must have a width that is less than the width of the release handle slot 29, so that it can pass through the release handle slot 29 when release handle 28 is pivoted in and out of the locked position. In a preferred embodiment, indicator scale 58 is printed or etched on the surface of housing face 14.

If desired, housing 12 may be constructed with locking ears 60 on housing face 14 on both sides of release handle slot 29. If it is necessary to prevent the rope lock from being unlocked, a padlock or bar can be passed through locking ears 60 after release handle 28 has been pivoted into the locked position to prevent release handle 28 from being pivoted out of the locked position. In a similar fashion, a padlock or bar can be passed through locking ears 60 when release handle 28 is in the unlocked position to prevent the release handle 28 from being pivoted into the locked position.

While there has been illustrated and described what are at present considered to be preferred and alternate embodiments of the present invention, it should be understood and appreciated that modifications may be made by those skilled in the art, and that the appended claims encompass all such modifications that fall within the full spirit and scope of the present invention.

What is claimed is:

1. A rope lock for locking a rope in place, comprising:
   a jaw block comprising a plurality of jaws for selectively gripping the rope;
   a release handle pivotally attached to said jaw block for selectively closing and opening said jaws;
   a housing, said housing comprising a guide rail on which said jaw block is slidably attached and a plurality of biasing members for said guide rail for biasing said jaw block to a neutral position on said guide rail;
   said housing further comprising a top, a bottom and a front, each of said top and bottom having an aperture for the rope and said front having a release handle slot for receiving said release handle when pivoted into a locked position;
   a lockout for automatically preventing said release handle from pivoting from a locked position when said jaw block is not neutrally positioned on said guide rail.

2. The rope lock of claim 1 wherein said jaws are pivotally mounted in said jaw block.

3. The rope lock of claim 1 wherein said biasing members are compression springs.

4. The rope lock of claim 1 further comprising an indicator for showing said jaw block's position relative to a neutral position on said guide rail.

5. The rope lock of claim 4 wherein said indicator comprises
   an indicator scale on said housing; and
   an indicator mark on said jaw block.

6. The rope lock of claim 4 wherein said scale comprises indications for heavy, light, and neutral.

7. The rope lock of claim 1 wherein said lockout comprises
   a locking pin slot in communication with said release handle slot;
   a locking pin attached to said release handle;
   wherein said locking pin passes through said locking pin slot when said release handle is pivoted out of the locked position, but only when said jaw block is neutrally positioned on said guide rail.

8. A rope lock for locking a rope in place, comprising:
   a jaw block comprising a plurality of pivotally mounted jaws for selectively gripping the rope;
   a release handle pivotally attached to said jaw block for selectively closing and opening said jaws;
   a housing, said housing comprising a guide rail on which said jaw block is slidably attached and a plurality of compression springs for biasing said jaw block to a neutral position on said guide rail;
   said housing further comprising a top, a bottom and a front, each of said top and bottom having an aperture for the rope and said front having a release handle slot for receiving said release handle when pivoted into a locked position;
   a lockout for automatically preventing said release handle from pivoting from a locked position when said jaw block is not neutrally positioned on said guide rail, said lockout comprising:
   a locking pin slot in communication with said release handle slot;
   a locking pin attached to said release handle;
   wherein said locking pin passes through said locking pin slot when said release handle is pivoted out of the locked position, but only when said jaw block is neutrally positioned on said guide rail; and
   an indicator for showing said jaw block's position relative to a neutral position on said guide rail, said indicator comprising an indicator scale on said housing; and an indicator mark on said jaw block.

* * * * *